United States Patent
Okazaki et al.

(10) Patent No.: US 6,458,902 B1
(45) Date of Patent: Oct. 1, 2002

(54) PROCESS FOR PRODUCING HYDROGENATED $C_9$ PETROLEUM RESIN AND HYDROGENATED $C_9$ PETROLEUM RESIN OBTAINED BY THE PROCESS

(75) Inventors: Takumi Okazaki, Ikoma (JP); Eiji Nagahara, Nara (JP); Hirokazu Keshi, Hirakata (JP)

(73) Assignee: Arakawa Chemical Industries, Ltd. (JP)

( * ) Notice: Subject to any disclaimer, the term of this patent is extended or adjusted under 35 U.S.C. 154(b) by 0 days.

(21) Appl. No.: 09/554,022

(22) PCT Filed: Sep. 22, 1999

(86) PCT No.: PCT/JP99/05209

§ 371 (c)(1),
(2), (4) Date: May 8, 2000

(87) PCT Pub. No.: WO00/18815

PCT Pub. Date: Apr. 6, 2000

(30) Foreign Application Priority Data

Sep. 30, 1998 (JP) ............................................. 10-278521

(51) Int. Cl.$^7$ .................................................. C08F 4/44
(52) U.S. Cl. ........................ 526/133; 526/131; 526/290; 526/346
(58) Field of Search ................................ 526/290, 133, 526/346, 131

(56) References Cited

U.S. PATENT DOCUMENTS 3,554,940 A * 1/1971 Arakawa et al. ................ 260/5
4,952,639 A 8/1990 Minomiya et al. ........ 525/327.9

FOREIGN PATENT DOCUMENTS

| JP | 58125703 | 7/1983 |
| JP | 4351614 | 12/1992 |
| JP | 5239125 | 9/1993 |
| WO | 9113106 | 9/1991 |
| WO | 9512623 | 5/1995 |

OTHER PUBLICATIONS

Database English–language Abstract JP 54 004985.
Database English–language Abstract JP 08 325338.
Database English–language Abstract JP 55 152771.

* cited by examiner

Primary Examiner—David W. Wu
Assistant Examiner—William K Cheung
(74) Attorney, Agent, or Firm—Baker Botts LLP

(57) ABSTRACT

Disclosed is a process for preparing a hydrogenated $C_9$ petroleum resin, the process comprising hydrogenating a $C_9$ petroleum resin obtained by polymerizing polymerizable monomers of a $C_9$ fraction using a non-phenolic Friedel-Crafts catalyst in the presence or absence of a non-phenolic molecular weight modifier. The hydrogenated $C_9$ petroleum resin obtained according to the present invention retains the characteristics of known hydrogenated $C_9$ petroleum resins and has high thermal stability, good light resistance, and remarkably low fluorescence.

7 Claims, No Drawings

PROCESS FOR PRODUCING HYDROGENATED C₉ PETROLEUM RESIN AND HYDROGENATED C₉ PETROLEUM RESIN OBTAINED BY THE PROCESS

TECHNICAL FIELD

The present invention relates to processes for preparing hydrogenated $C_9$ petroleum resins and hydrogenated $C_9$ petroleum resins obtainable by said processes.

BACKGROUND ART

Conventionally, $C_9$ petroleum resins are prepared by polymerizing $C_9$ fractions obtained by naphtha cracking or the like, in the presence of a phenol (a molecular weight modifier) using a boron trifluoride phenol complex (a Friedel-Crafts catalyst). Hydrogenated $C_9$ petroleum resins are obtained by hydrogenating the $C_9$ petroleum resins under pressure, and because of their good initial color, tack, adhesion and high compatibility with other resins, hydrogenated $C_9$ petroleum resins are mixed and melted with various plastics, rubbers and oil-soluble materials for use as tacky adhesives or other adhesives, sealing agents, paints, inks, polyolefin films, plastic moldings and the like. Further, hydrogenated $C_9$ petroleum resins are lighter in color, have less odor, and are higher in heat stability and weather resistance, than unhydrogenated $C_9$ petroleum resins, dicyclopentadiene (DCPD) petroleum resins and $C_5$ petroleum resins.

Although hydrogenated $C_9$ petroleum resins have excellent properties as described above, there is a demand for further improvement in their color and stability characteristics such as thermal discoloration resistance and light resistance, in the fields where the color of resins is particularly important, such as the fields of sanitary applications, foods and clear sealants. Further, conventional hydrogenated $C_9$ petroleum resins are highly fluorescent, and since fluorescent materials are suspected of being carcinogenic, reduction of florescence of hydrogenated $C_9$ petroleum resins is also demanded.

Hydrogenated $C_9$ petroleum resins can be improved in thermal discoloration resistance and light resistance and reduced in fluorescence by, for example, adding increased amounts of generally used additives, such as antioxidants and UV absorbers. However, this technique is economically disadvantageous since these additives are expensive. Further, addition of an increased amount of an antioxidant improves the thermal stability only to a limited extent and tends to impair the light resistance, hence undesirable from the viewpoints of performance characteristics and properties. Furthermore, although UV absorbers improve the light resistance and reduce the fluorescence, they are yellowish in color and thus impair the initial color of the resins.

Known substitutes for hydrogenated $C_9$ petroleum resins include hydrogenated pure monomer resins prepared by hydrogenating aromatic pure monomer resins (resins obtainable by polymerizing aromatic pure monomers) such as low-molecular styrene resins, α-methylstyrene resins and isopropenyltoluene resins. The hydrogenated pure monomer resins are light in color, excellent in thermal discoloration resistance and light resistance, and less fluorescent. However, low-molecular styrene resins are prone to have a molecular weight greater than ordinary $C_9$ petroleum resins, and therefore tend to be less compatible with polymers and elastomers. Further, it is difficult to prepare hydrogenated α-methylstyrene resins or hydrogenated isopropenyltoluene resins, since decomposition reaction is likely to proceed during hydrogenation, due to the methyl group present at the α-position of the benzene ring. Moreover, all of the above resins are prepared from highly purified monomers, and thus are expensive and unsuitable for practical use.

DISCLOSURE OF INVENTION

The main object of the present invention is to provide a hydrogenated $C_9$ petroleum resin. and a process for preparing the same, said hydrogenated $C_9$ petroleum resin retaining characteristics of known hydrogenated $C_9$ petroleum resins and being excellent in thermal stability and light resistance and remarkably low in fluorescence.

The present inventors conducted extensive research in view of the above problems, and found that thermal stability and other properties of hydrogenated $C_9$ petroleum resins are adversely affected by polymerization catalysts (for example, a boron trifluoride phenol complex) used for preparation of $C_9$ petroleum resins as the starting materials of hydrogenated $C_9$ petroleum resins, or phenols used as molecular weight modifiers during polymerization. Based on this finding, they further found that hydrogenated $C_9$ petroleum resins obtained by the processes described below accomplish the above object.

The present invention provides the following processes for preparing hydrogenated $C_9$ petroleum resins, hydrogenated $C_9$ petroleum resins obtainable by said processes, tackifier, additive for plastics, and adhesive composition.

1. A process for preparing a hydrogenated $C_9$ petroleum resin, comprising hydrogenating a $C_9$ petroleum resin obtained by polymerizing polymerizable monomers of a $C_9$ fraction using a non-phenolic Friedel-Crafts catalyst in the presence or absence of a non-phenolic molecular weight modifier.

2. A process according to Item 1, wherein the non-phenolic Friedel-Crafts catalyst is boron trifluoride or a boron trifluoride ether complex.

3. A process according to Item 1 or 2, wherein the polymerizable monomers include up to 20 wt. % of a monomer fraction having a higher boiling point than indene.

4. A process according to any one of Items 1 to 3, wherein the polymerizable monomers include up to 20 wt. % of a monomer fraction having a higher boiling point than indene, at least 50 wt. % of vinyltoluene, and up to 20 wt. % of indene.

5. A process according to any one of Items 1 to 4, wherein the hydrogenation degree of the aromatic nuclei of the hydrogenated $C_9$ petroleum resin is at least 50%.

6. A hydrogenated $C_9$ petroleum resin obtainable by a process according to any one of Items 1 to 5.

7. A tackifier comprising a hydrogenated $C_9$ petroleum resin according to Item 6.

8. An additive for plastics, comprising a hydrogenated $C_9$ petroleum resin according to Item 6.

9. An adhesive composition comprising a tackifier according to Item 7 and a base resin for adhesives.

According to the process of the present invention, a hydrogenated $C_9$ petroleum resin is prepared by hydrogenating a $C_9$ petroleum resin obtained by polymerizing polymerizable monomers of a $C_9$ fraction. The process of the invention can be carried out by following the steps of conventional techniques for preparing hydrogenated $C_9$ petroleum resins, except that the $C_9$ petroleum resin is one obtained using a non-phenolic Friedel-Crafts catalyst in the presence or absence of a non-phenolic molecular weight modifier. The non-phenolic Friedel-Crafts catalyst and non-phenolic molecular weight modifier are employed so that the $C_9$ petroleum resin does not contain detectable amounts of phenols. Thus, the $C_9$ petroleum resin may contain phenols in a proportion smaller than the detection limit. Phenols can be detected by, for example, a color test using iron (III)

chloride ("Yukikagobutsu Kakuninhou (Organic Compound Detection Method) I", Chap. 1, pp. 9–12).

Phenols usable as phenolic Friedel-Crafts catalysts or phenolic molecular weight modifiers include $C_6$–$C_{20}$ phenols having a —OH group in the molecule, such as phenol, and cresol, xylenol, p-tert-butylphenol, p-octylphenol, nonylphenol and like alkyl substituted phenols.

Any Friedel-Crafts catalysts free from phenolic components can be employed for preparation of the $C_9$ petroleum resin for use in the invention, without limitation. Specific examples of such catalysts include boron trifluoride, boron trifluoride ethyl ether complexes, boron trifluoride butyl ether complexes, boron trifluoride acetic acid complexes, aluminum chloride, titanium tetrachloride, tin tetrachloride and like Lewis acids; and sulfuric acid, phosphoric acid, perchloric acid and like protonic acids. From the standpoint of industrial availability, boron trifluoride and boron trifluoride ethyl ether complexes are preferred. If a Friedel-Crafts catalyst containing a phenol, such as a boron trifluoride phenol complex, is used, the hydrogenated $C_9$ petroleum resin obtained by hydrogenating the $C_9$ petroleum resin has poor thermal discoloration resistance.

The $C_9$ petroleum resin for use in the invention is prepared in the presence or absence of a non-phenolic molecular weight modifier. Accordingly, no phenols are used as molecular weight modifiers during preparation of the $C_9$ petroleum resin. Further, in the steps other than the molecular weight modification step, phenols serving as molecular weight modifiers must not be added. However, molecular weight modifiers other than phenols may be used in the invention without limitation. Useful molecular weight modifiers include diethyl ether, tetrahydrofuran, acetone, DMF, ethyl acetate, ethanol, isopropanol, toluene, xylene, mesitylene and water. $C_9$ petroleum resins obtained in the absence of a molecular weight modifier tend to have a higher molecular weight and a higher softening point than $C_9$ petroleum resins obtained in the presence of a molecular weight modifier, but the molecular weight and the softening point can be controlled as desired by selecting suitable polymerization conditions and other factors.

The polymerizable monomers used as the starting materials of the $C_9$ petroleum resin are those contained in a $C_9$ fraction, i.e., a cracked oil fraction which is obtained by thermal cracking or catalytic cracking of naphtha and has a boiling point of about 140 to 280° C. in atmospheric pressure. Specific examples of the polymerizable monomers include styrene, α-methylstyrene, β-methylstyrene, vinyltoluene, indene, alkylindene, dicyclopentadiene, ethylbenzene, trimethylbenzene and naphthalene.

The proportions of these polymerizable monomers for forming the $C_9$ petroleum resin are not limited, but it is preferred to use a $C_9$ fraction containing up to 20 wt. % of a monomer fraction having a higher boiling point than indene, so that the resulting hydrogenated $C_9$ petroleum resin is further improved in heat stability and light resistance and reduced in fluorescence. It is more preferred to use a $C_9$ fraction comprising up to 20 wt. % of a monomer fraction having a higher boiling point than indene, at least 50 wt. % of vinyltoluene, and up to 20 wt. % of indene. It is still more preferred to use a $C_9$ fraction containing up to 15 wt. % of a monomer fraction having a higher boiling point than indene. Particularly preferred is a $C_9$ fraction comprising up to 15 wt. % of a monomer fraction having a higher boiling point than indene, at least 52 wt. % of vinyltoluene, and up to 15 wt. % of indene. A $C_9$ fraction comprising the polymerizable monomers in the above proportions can be obtained by suitably selecting the distillation conditions for preparation of the $C_9$ fraction.

The proportions of the polymerizable monomers in the $C_9$ petroleum resin can be calculated by any methods without limitation. Generally, however, the following method (1) or (2) is employed:

(1) The proportions (amounts) of monomers in the $C_9$ fraction are calculated from the results of gas chromatography of the $C_9$ fraction before Friedel-Crafts catalyst polymerization. Then, the proportions (amounts) of monomers remaining after polymerization of the $C_9$ fraction are calculated from the results of gas chromatography of the liquid fraction remaining after polymerization (the fraction removed as unreacted components from the polymerized oil by distillation). The proportions of monomers in the liquid fraction are subtracted from the proportions of monomers in the $C_9$ fraction, to thereby estimate the proportions of polymerizable monomers in the $C_9$ petroleum resin.

(2) The $C_9$ petroleum resin is subjected to pyrolysis gas chromatography to estimate the proportions of polymerizable monomers in the $C_9$ petroleum resin.

The $C_9$ petroleum resin can be prepared by conventional methods such as the following: 100 parts by weight of a $C_9$ fraction (polymerizable monomers) is polymerized using about 0.01 to 5 parts by weight of a non-phenolic Friedel-Crafts catalyst at about −60° C. to 60° C. to obtain a polymerized oil, and about 0.1 to 20 parts by weight of a basic substance is added to 100 parts by weight of the polymerized oil, followed by neutralization reaction at 10 to 100° C. Usable basic substances include calcium hydroxide, sodium hydroxide, potassium hydroxide and aqueous ammonium. The polymerized oil neutralized with the basic substance is washed with water, where necessary. Then, about 0.1 to 20 parts by weight of activated clay is added to carry out clay treatment at 10 to 100° C. Thereafter, the activated clay is filtered off, and the polymerized oil was distilled to remove unreacted components, to thereby obtain a $C_9$ petroleum resin. A molecular weight modifier, when employed, is used in a proportion of about 0.01 to 3 wt. % relative to the $C_9$ fraction.

It is preferred that the $C_9$ petroleum resin have a softening point of about 50 to 200° C., so that the resulting hydrogenated $C_9$ petroleum resin has properties of general hydrogenated $C_9$ petroleum resins. The $C_9$ petroleum resin preferably has a number average molecular weight of about 250 to 4000.

The hydrogenated $C_9$ petroleum resin of the invention can be obtained by hydrogenating the above $C_9$ petroleum resin by a conventional hydrogenation technique to a desired hydrogenation degree.

The $C_9$ petroleum resin is hydrogenated at least to such an extent that 100% of its olefinic double bonds are hydrogenated. Hydrogenation of 100% of the olefinic double bonds means that no signal of an olefinic double bond is significantly observed at 4.5 to 6.0 ppm in proton NMR analysis.

The hydrogenation degree of the aromatic nuclei is not limited. Generally, however, the higher the hydrogenation degree is, the better the stability characteristics (such as thermal stability and light resistance) become. Also, a higher hydrogenation degree tends to result in reduced fluorescence. Therefore, the hydrogenation degree of aromatic nuclei is preferably at least 50%, so that a hydrogenated $C_9$ petroleum resin can be obtained which has high stability and low fluorescence. The hydrogenation degree of aromatic nuclei can be calculated from the area of $^1$H-spectrum of aromatic rings appearing at about 7 ppm in $^1$H-NMR of the $C_9$ petroleum resin and said area in $^1$H-NMR of the resulting hydrogenated $C_9$ petroleum resin, according to the following equation:

Hydrogenation degree (%)={1−(spectrum area in hydrogenated resin/spectrum area in starting resin)}×100

The hydrogenation reaction is carried out in the presence of a hydrogenation catalyst under conditions suitable for hydrogenating the $C_9$ petroleum resin to the above specified degree.

Usable hydrogenation catalysts include various known catalysts such as nickel, palladium, platinum, cobalt, rhodium, ruthenium and like metals, and their oxides and sulfides. These hydrogenation catalysts may be used as supported on porous carriers with large surface areas, such as alumina, silica (diatomaceous earth), carbon and titania. Among these catalysts, a nickel-diatomaceous earth catalyst is preferably used in the invention, from the standpoints of the cost and ease of attaining the above specified hydrogenation degree. The amount of the catalyst to be used is about 0.1 to 5 wt. %, preferably about 0.1 to 3 wt. %, relative to the $C_9$ petroleum resin.

The hydrogenation reaction is carried out at a hydrogenation pressure of usually about 30 to 300 $Kg/cm^2$ and at a reaction temperature of usually about 150 to 320° C. Preferably, the hydrogenation pressure is about 100 to 200 $Kg/cm^2$ and the reaction temperature is about 200 to 300° C. If the hydrogenation pressure is less than 30 $Kg/cm^2$ or the reaction temperature is lower than 150° C., the hydrogenation is difficult to proceed. On the other hand, if the reaction temperature is higher than 320° C., the softening point is liable to be lowered owing to decomposition. The reaction time is usually about 1 to 7 hours, preferably about 2 to 7 hours. For the hydrogenation reaction, the $C_9$ petroleum resin is used as melted or dissolved in a solvent. Usable solvents include cyclohexane, n-hexane, h-heptane and decalin. The above-mentioned amount of catalyst and reaction time are applicable when the hydrogenation is carried out by batch reaction system. However, flow reaction systems (such as fixed bed reaction system or fluidized bed reaction system) can be also employed.

The softening point of the hydrogenated $C_9$ petroleum resin thus obtained is usually about 50 to 200° C., although depending on the intended use. The hydrogenated $C_9$ petroleum resin preferably has a number average molecular weight of about 250 to 4000. The hydrogenated $C_9$ petroleum resin may contain any of various additives. The additives may be added after preparation of the hydrogenated $C_9$ petroleum resin, or during or after preparation of the $C_9$ petroleum resin. Usable additives include, for example, antioxidants. Since antioxidants are not the molecular weight modifier defined in the present invention, the results of the invention are not defeated even if the hydrogenated $C_9$ petroleum resin contains a hindered phenol antioxidant such as 2,6-di-t-butyl-p-cresol, stearyl-β-(3,5-di-t-butyl-4-hydroxyphenyl)propionate, 2,2'-methylenebis (4-methyl-6-t-butylphenol) or tetrakis-[methylene-3-(3',5'-di-t-butyl-4'-hydroxyphenyl)propionate]methane.

Like conventional hydrogenated $C_9$ petroleum resins, the hydrogenated $C_9$ petroleum resin of the invention is excellent in tack, adhesion and compatibility, and is colorless, transparent, tasteless and odorless. The hydrogenated $C_9$ petroleum resin of the invention is highly compatible with, for example, elastomers and plastics such as ethylene-vinyl acetate copolymers (EVA); amorphous poly-α-olefin (APAO); natural rubbers (NR); styrene-butadiene rubbers (SBR); styrene-isoprene-styrene block copolymers (SIS); styrene-butadiene-styrene block copolymers (SBS); styrene-ethylene/butyrene-styrene block copolymers (SEBS), styrene-ethylene/propylene-styrene block copolymers (SEPS) and like triblock elastomers; polyethylenes; polypropylenes; polybutadienes; polystyrenes; AS resins, MS resins; polyphenylene ethers; norbornene open-ring polymers; and cyclohexadiene polymers. As described before, the hydrogenated $C_9$ petroleum resin of the invention is excellent in various stability characteristics, in particular thermal stability and light resistance, and has remarkably low fluorescence.

The hydrogenated $C_9$ petroleum resin of the invention can be applied in the fields where various hydrogenated petroleum resins (including hydrogenated $C_9$ petroleum resins, hydrogenated $C_5$ petroleum resins, hydrogenated DCPD petroleum resins, hydrogenated $C_9$-DCPD petroleum resins and hydrogenated pure monomer petroleum resins), hydrogenated terpene resins, hydrogenated cumarone-indene resins, rosin derivatives or the like are employed. For example, the resin of the invention can be incorporated as a tackifier component into a base resin for adhesives (including tacky adhesives, sealing adhesives and the like). In particular, the resin of the invention is useful and effective as a tackifier for toiletry materials, sanitary materials, clear sealants, EVA hot melt adhesives, protective films, laminating adhesives for glasses and transparent plastics, and adhesives for glass interlayers. The resin of the invention is also useful as an additive for plastics such as polyolefin films or sheets, optical plastics and transparent plastics. Further, the resin can be utilized as an additive for rubbers, inks, paints, plastic moldings, sheets, films and foams. In such applications, the resin of the invention may be used as mixed with any of various other resins at a desired mixing ratio, and any of various additives such as antioxidants and UV absorbers may be added to the resin of the invention.

The hydrogenated $C_9$ petroleum resin obtained by the process of the invention is excellent in tack, adhesion and compatibility, colorless, transparent, tasteless and odorless, like conventional hydrogenated $C_9$ petroleum resins. Moreover, the hydrogenated $C_9$ petroleum resin of the invention is improved in thermal stability and light resistance and remarkably reduced in fluorescence, even if it has a hydrogenation degree of aromatic rings equivalent to that of conventional hydrogenated $C_9$ petroleum resins. Further, when the hydrogenated $C_9$ petroleum resin of the invention is added as a tackifier to various resins, the resulting adhesive compositions or the like have equivalent tack or adhesion characteristics and improved thermal stability, as compared with adhesive compositions or the like comprising conventional hydrogenated $C_9$ petroleum resins.

BEST MODE FOR CARRYING OUT THE INVENTION

The following Examples and Comparative Examples are provided to illustrate the present invention in further detail, and should not be construed to limit the scope of the invention. In these examples, all parts are by weight.

EXAMPLE 1

An ordinary $C_9$ fraction (proportions of polymerizable monomers: 37% of vinyltoluene, 35% of indene, 22% of a monomer fraction having a higher boiling point than indene, and 6% of other monomers) obtained by naphtha cracking was distilled to obtain a purified $C_9$ fraction (proportions of polymerizable monomers: 58% of vinyltoluene, 9% of indene, 11% of a monomer fraction having a higher boiling point than indene, and 22% of other monomers) having reduced high-boiling components. The purified $C_9$ fraction was cationically polymerized using a boron trifluoride gas as a catalyst, giving a special $C_9$ petroleum resin (softening point: 100° C., number average molecular weight: 760). 100 parts of the special $C_9$ petroleum resin and 2 parts of a nickel-diatomaceous earth catalyst ("N-113" manufactured by Nikki Chemical Co., Ltd.) were placed in an autoclave, and subjected to hydrogenation reaction at a hydrogen pressure of 200 $kg/cm^2$ and a reaction temperature of 270° C., for 5 hours. After completion of the reaction, the obtained resin was dissolved in 300 parts of cyclohexane, and the solution was filtered to remove the catalyst. The filtrate and 0.35 parts of an antioxidant ("Irganox 1010" manufactured by Ciba-Speciality Chemicals K.K.) were placed in a 1-liter separable flask equipped with a stirrer, a reflux condenser, a thermometer, a thermoregulator and a pressure indicator. The solvent was removed by gradually increasing the temperature to 200° C. and gradually reducing the pressure to 20 torr, to thereby obtain 98 parts of a hydrogenated $C_9$ petroleum resin (a) having a number average molecular weight of 790, a softening point of 102.5° C. and a hydrogenation degree of aromatic rings of 94%.

Table 1 shows the results of detection of phenols in the special $C_9$ petroleum resin used as the starting material for hydrogenation, and the properties of the obtained resin (a). The softening point was measured by the ring and ball method according to JIS K 2531.

Table 2 shows the thermal stability, light resistance and fluorescence of the resin (a). Table 3 shows the results of performance evaluation of an SIS tacky adhesive composition comprising the resin (a) as a tackifier.

EXAMPLE 2

The procedure of Example 1 was followed except that the hydrogenation conditions were changed as shown in Table 1, to thereby obtain 99 parts of a hydrogenated $C_9$ petroleum resin (b). Table 1 shows the results of detection of phenols in the special $C_9$ petroleum resin used as the starting material for hydrogenation, and the properties of the resin (b). Table 2 shows the thermal stability, light resistance and fluorescence of the resin (b). Table 3 shows the results of performance evaluation of an SBS tacky adhesive composition comprising the resin (b) as a tackifier.

EXAMPLE 3

The procedure of Example 1 was followed except that the hydrogenation conditions were changed as shown in Table 1, to thereby obtain 97 parts of a hydrogenated $C_9$ petroleum resin (c). Table 1 shows the results of detection of phenols in the special $C_9$ petroleum resin used as the starting material for hydrogenation, and the properties of the resin (c). Table 2 shows the thermal stability, light resistance and fluorescence of the resin (c). Table 3 shows the results of performance evaluation of an EVA hot melt adhesive composition comprising the resin (c) as a tackifier.

EXAMPLE 4

A $C_9$ petroleum resin (softening point: 119° C., number average molecular weight: 760) was obtained by cationically polymerizing, using a boron trifluoride gas as a catalyst, an ordinary $C_9$ fraction (proportions of polymerizable monomers: 37% of vinyltoluene, 35% of indene, 22% of a monomer fraction having higher boiling point than indene, and 6% of other monomers) obtained by naphtha cracking. Hydrogenation reaction and subsequent treatment were carried out in the same manner as in Example 1 except for using the thus obtained $C_9$ petroleum resin in place of the special $C_9$ petroleum resin used in Example 1 and changing the hydrogenation conditions as shown in Table 1, to thereby obtain 96 parts of a hydrogenated $C_9$ petroleum resin (d) having a hydrogenation degree of aromatic rings of 68%. Table 1 shows the results of detection of phenols in the $C_9$ petroleum resin used as the starting material for hydrogenation, and the properties of the resin (d). Table 2 shows the thermal stability, light resistance and fluorescence of the resin (d). Table 3 shows the results of performance evaluation of an SBS tacky adhesive composition comprising the resin (d) as a tackifier.

EXAMPLE 5

The procedure of Example 1 was followed except for using, in place of the boron trifluoride gas, a boron trifluoride diethyl ether complex as a polymerization catalyst, and changing the hydrogenation conditions as shown in Table 1, to thereby obtain 99 parts of a hydrogenated $C_9$ petroleum resin (e). Table 1 shows the results of detection of phenols in the special $C_9$ petroleum resin used as the starting material for hydrogenation, and the properties of the resin (e). Table 2 shows the thermal stability, light resistance and fluorescence of the resin (e). Table 3 shows the results of performance evaluation of an SBS tacky adhesive composition comprising the resin (e) as a tackifier.

Comparative Example 1

An ordinary $C_9$ fraction (proportions of polymerizable monomers: 37% of vinyltoluene, 35% of indene, 22% of a monomer fraction having a higher boiling point than indene, and 6% of other monomers) obtained by naphtha cracking was cationically polymerized using a boron trifluoride phenol complex as a catalyst, to obtain a $C_9$ petroleum resin (softening point: 117.5° C., number average molecular weight: 740). Hydrogenation reaction and subsquent treatment were carried out in the same manner as in Example 1 except for using the thus obtained $C_9$ petroleum resin as the starting material and changing the hydrogenation conditions as shown in Table 1, to thereby obtain 98 parts of a hydrogenated $C_9$ petroleum resin (f) having a hydrogenation degree of aromatic rings of 95%. Table 1 shows the results of detection of phenols in the $C_9$ petroleum resin used as the starting material for hydrogenation, and the properties of the resin (f). Table 2 shows the thermal stability, light resistance and fluorescence of the resin (f). Table 3 shows the results of performance evaluation of an SIS tacky adhesive composition comprising the resin (f) as a tackifier.

Comparative Example 2

The procedure of Comparative Example 1 was followed except that the hydrogenation conditions were changed as shown in Table 1, to thereby obtain 99 parts of a hydrogenated $C_9$ petroleum resin (g). Table 1 shows the results of detection of phenols in the $C_9$ petroleum resin used as the starting material for hydrogenation, and the properties of the resin (g). Table 2 shows the thermal stability, light resistance and fluorescence of the resin (g). Table 3 shows the results of performance evaluation of an SBS tacky adhesive composition comprising the resin (g) as a tackifier.

Comparative Example 3

The procedure of Comparative Example 1 was followed except that the hydrogenation conditions were changed as shown in Table 1, to thereby obtain 97 parts of a hydrogenated $C_9$ petroleum resin (h). Table 1 shows the results of detection of phenols in the $C_9$ petroleum resin used as the starting material for hydrogenation, and the properties of the resin (h). Table 2 shows the thermal stability. light resistance and fluorescence of the resin (h). Table 3 shows the results of performance evaluation of an EVA hot melt adhesive composition comprising the resin (h) as a tackifier.

Comparative Example 4

An ordinary $C_9$ fraction (proportions of polymerizable monomers: 37% of vinyltoluene, 35% of indene, 22% of a monomer fraction having a higher boiling point than indene, and 6% of other monomers) obtained by naphtha cracking was distilled to obtain a purified $C_9$ fraction (proportions of polymerizable monomers: 58% of vinyltoluene, 9% of indene, 11% of a monomer fraction having a higher boiling point than indene, and 22% of other monomers) having reduced high-boiling components. The purified $C_9$ fraction was cationically polymerized using a boron trifluoride phenol complex as a catalyst, giving a special $C_9$ petroleum resin (softening point: 100° C., number average molecular weight: 730). Hydrogenation reaction and subsequent treatment were carried out in the same manner as in Example 1 except for using the thus obtained special $C_9$ petroleum resin as the starting material and changing the hydrogenation conditions as shown in Table 1, to thereby obtain 99 parts of a hydrogenated $C_9$ petroleum resin (i) having a hydrogenation degree of aromatic rings of 70%. Table 1 shows the results of detection of phenols in the special $C_9$ petroleum resin used as the starting material for hydrogenation, and the properties of the resin (i). Table 2 shows the thermal stability, light resistance and fluorescence of the resin (i). Table 3 shows the results of performance evaluation of an SBS tacky adhesive composition comprising the resin (i) as a tackifier.

Comparative Example 5

An ordinary $C_9$ fraction (proportions of polymerizable monomers: 37% of vinyltoluene, 35% of indene, 22% of a monomer fraction having a higher boiling point than indene, and 6% of other monomers) obtained by naphtha cracking was cationically polymerized using a boron trifluoride gas as a catalyst and using phenol (0.2% relative to the $C_9$ fraction) as a molecular weight modifier, giving a $C_9$ petroleum resin (softening point: 115° C., number average molecular weight: 730). The obtained $C_9$ petroleum resin was hydrogenated under the conditions shown in Table 1 to thereby obtain 98 parts of a hydrogenated $C_9$ petroleum resin (j) having a hydrogenation degree of aromatic rings of 71%. Table 1 shows the results of detection of phenols in the $C_9$ petroleum resin used as the starting material for hydrogenation, and the properties of the obtained resin (j). Table 2 shows the thermal stability, light resistance and fluorescence of the resin (j). Table 3 shows the results of performance evaluation of an SBS tacky adhesive composition comprising the resin (j) as a tackifier.

having a higher boiling point than indene and 22% of other monomers; softening point: 100° C.; number average molecular weight: 760), *2 indicates a $C_9$ petroleum resin (proportions of polymerizable monomers: 37% of vinyltoluene, 35% of indene, 22% of a monomer fraction having a higher boiling point than indene and 6% of other monomers; softening point: 119° C.; number average molecular weight: 760), *3 indicates a $C_9$ petroleum resin (proportions of polymerizable monomers: the same as in the $C_9$ petroleum resin *2; softening point: 117.5° C.; number average molecular weight: 740), *4 indicates a special $C_9$ petroleum resin (proportions of polymerizable monomers: the same as in the special $C_9$ petroleum resin *1; softening point 100° C.; number average molecular weight: 730), *5 indicates a $C_9$ petroleum resin (proportions of polymerizable monomers: 37% of vinyltoluene, 35% of indene, 22% of a monomer fraction having a higher boiling point than indene and 6% of other monomers; softening point: 115° C.; number average molecular weight: 730), and *6 indicates phenol.

(Method of Detection of Phenols)

The special $C_9$ petroleum resins and $C_9$ petroleum resins were subjected to the following color test using iron (III) chloride ["Yukikagoubutsu Kakuninhou (Organic compound detection method) I", Chap. 1, pp. 9–12], to detect phenols derived from the Friedel-Crafts catalyst and/or the molecular weight modifier.

0.3 g of each of the special $C_9$ petroleum resins and $C_9$ petroleum resins was separately dissolved in chloroform, and five drops of an iron (III) chloride reagent were added to each of the solutions. The color of the solutions was observed and rated as follows: 1; light yellow (color of the chloroform solution as such), 2; dark yellow, 3; yellowish brown, 4; light green, 5; green. The greater the value, the greater the phenol content. The iron (III) chloride reagent

TABLE 1

|  | Hydrogenated $C_9$ petroleum resin | Form of boron trifluoride (catalyst) | Molecular weight modifier *6 | Starting resin | Detection of phenols |
|---|---|---|---|---|---|
| Ex. 1 | a | Gas | Not used | *1 | 1 |
| Ex. 2 | b | Gas | Not used | *1 | 1 |
| Ex. 3 | c | Gas | Not used | *1 | 1 |
| Ex. 4 | d | Gas | Not used | *2 | 1 |
| Ex. 5 | e | Ether complex | Not used | *1 | 1 |
| Comp. Ex. 1 | f | Phenol complex | Not used | *3 | 2 |
| Comp. Ex. 2 | g | Phenol complex | Not used | *3 | 2 |
| Comp. Ex. 3 | h | Phenol complex | Not used | *3 | 2 |
| Comp. Ex. 4 | i | Phenol complex | Not used | *4 | 2 |
| Comp. Ex. 5 | j | Gas | Used | *5 | 4 |

|  | Hydrogenation Conditions | | | | Properties of hydrogenated resin | | | |
|---|---|---|---|---|---|---|---|---|
|  | Amount of catalyst (%) | Temp. (° C.) | Hydrogen pressure (kg/cm²) | Time (hour) | Softening point (° C.) | Number average molecular weight | Aromatic ring hydrogenation degree (%) | Hazen color |
| Ex. 1 | 2.0 | 270 | 200 | 5 | 102 | 790 | 94 | 10 |
| Ex. 2 | 0.8 | 275 | 200 | 5 | 98 | 780 | 65 | 20 |
| Ex. 3 | 0.45 | 270 | 200 | 5 | 99 | 760 | 15 | 30 |
| Ex. 4 | 0.8 | 290 | 200 | 5 | 102 | 720 | 68 | 20 |
| Ex. 5 | 0.8 | 275 | 200 | 5 | 99 | 780 | 65 | 20 |
| Comp. Ex. 1 | 1.2 | 300 | 200 | 5 | 100 | 700 | 95 | 20 |
| Comp. Ex. 2 | 0.8 | 295 | 200 | 5 | 101 | 720 | 70 | 30 |
| Comp. Ex. 3 | 0.4 | 290 | 200 | 5 | 98 | 690 | 20 | 80 |
| Comp. Ex. 4 | 0.8 | 275 | 200 | 5 | 98 | 760 | 70 | 20 |
| Comp. Ex. 5 | 0.8 | 290 | 200 | 5 | 97 | 700 | 71 | 40 |

In Table 1, *1 indicates a special $C_9$ petroleum resin (proportions of polymerizable monomers: 58% of vinyltoluene, 9% of indene, 11% of a monomer fraction used was a solution obtained by dissolviing 1.0 g of anhydrous iron (III) chloride in 100 ml of chloroform and adding 8 ml of pyridine, followed by thorough stirring and filtration.

(Thermal Stability)

30 g of each of the hydrogenated $C_9$ petroleum resins obtained in the Examples and Comparative Examples was separately placed in 70 cc glass bottles (40 mm in mouth diameter and 70 mm in depth) and heated at 180° C. in a circulating air dryer. After 8, 24 and 48 hours, the color of the resins was determined on the Gardner color scale. Smaller values indicate less discoloration and better thermal stability.

(Light Resistance)

10 g of each of the hydrogenated $C_9$ petroleum resins obtained in the Examples and Comparative Examples was separately placed in ointment cans of 55 mm diameter, melted at 180° C. for 10 minutes in a dryer and taken out from the cans, giving disk-shaped test pieces. The test pieces were placed in a light resistance tester (Xenon lamp irradiation, "SUNTEST" manufactured by HERAEUS), and irradiated with light for 72 hours. Then, the degree of discoloration of the test pieces was visually inspected, and rated on the following scale:

A; No discoloration, B; Some discoloration, C; Marked discoloration.

Subtle differences in the degree of discoloration were indicated by plus and minus signs.

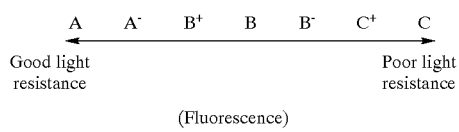

(Fluorescence)

50 g of each of the hydrogenated $C_9$ petroleum resins obtained in the Examples and Comparative Examples was separately placed in ointment cans of 55 mm diameter. The ointment cans were placed in a fluorescence measuring box and irradiated with lights having wavelengths of 2537 angstroms and 3650 angstroms to visually inspect the fluorescence. The degree of fluorescence was rated on the following scale:

A; Substantially no fluorescence, B; Slight fluorescence, C; Marked fluorescence.

Subtle differences are indicated by plus and minus signs.

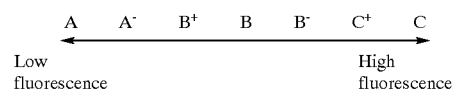

TABLE 2

| Hydrogenated $C_9$ petroleum resin | Thermal stability (Gardner color) | | | Light resis- tance | Fluores- cence |
| --- | --- | --- | --- | --- | --- |
| | 8 hrs | 24 hrs | 48 hrs | | |
| Ex.1 a | <1 | <1 | <1 | A | A |
| Ex.2 b | <1 | <1 | 2 | A | A |
| Ex.3 c | 1 | 4 | 6 | B | B |
| Ex.4 d | <1 | 1 | 3 | B | A⁻ |
| Ex.5 e | <1 | <1 | 2 | A | A |
| Comp. Ex.1 f | <1 | 2 | 4 | C | B⁺ |
| Comp. Ex.2 g | 1 | 5 | 9 | C | C |
| Comp. Ex.3 h | 5 | 10 | 13 | C | C |
| Comp. Ex.4 i | 1 | 3 | 6 | A⁻ | A |
| Comp. Ex.5 j | 1 | 4 | 8 | C | C |

The following performance evaluation tests were carried out using SIS block rubber tacky adhesive compositions comprising the hydrogenated $C_9$ petroleum resins obtained in Example 1 and Comparative Example 1; SBS block rubber tacky adhesive compositions comprising the hydrogenated $C_9$ petroleum resins obtained in Examples 2, 4 and 5 and Comparative Examples 2, 4 and 5; and EVA hot melt adhesive compositions comprising the hydrogenated $C_9$ petroleum resins obtained in Example 3 and Comparative

EXAMPLE 3

(Preparation of SIS Block Rubber Tacky Adhesive Compositions)

A rubber material was prepared by melting and mixing an SIS block copolymer ("Cariflex TR1107" manufactured by Shell Chemical Co.) and a paraffinic oil ("DI Process PW90" manufactured by Idemitsu Kosan Co., Ltd.), the weight ratio of the former to the latter being 100:30. 130 parts of the obtained rubber material was gradually added to 100 parts of each of the hydrogenated $C_9$ petroleum resins (tackifiers) obtained in Example 1 and Comparative Example 1 while heating the resins to 180° C. with stirring, to thereby obtain tacky adhesive compositions.

(Preparation of SBS Block Rubber Tacky Adhesive Compositions)

A rubber material was prepared by melting and mixing an SBS block copolymer ("Tufprene A" manufactured by Asahi Chemical Industry Co., Ltd.) and a naphthenic oil ("Shell Flex 371 JY" manufactured by Shell Japan Ltd.), the weight ratio of the former to the latter being 25:20. 45 parts of the obtained rubber material was gradually added to 55 parts of each of the hydrogenated $C_9$ petroleum resins (tackifiers) obtained in Examples 2, 4 and 5 and Comparative Examples 2, 4 and 5 while heating the resins to 180° C. with stirring, to thereby obtain tacky adhesive compositions.

The SIS block rubber tacky adhesive compositions and SBS block rubber tacky adhesive compositions thus obtained were tested for performance characteristics by the following methods.

[Adhesion]

Each of the tacky adhesive compositions was melted and applied on a polyethylene terephthalate film to a thickness of 32 μm. Each of the resulting films (hereinafter referred to as "PET films") was compression bonded to a stainless steel plate as an adherend using a rubber roller weighing 2 kg according to JIS Z 0237, so as to form a bonding area of 25 mm×125 mm. The obtained stainless steel plates with the PET films were allowed to stand at 20° C. for 24 hours, and subjected to a peeling test at an angle of 180 degree using a Tensilon tester to determine the adhesion (kg/25 mm).

[Tack]

According to JIS Z 0237, a No. 14 steel ball was rolled from a 30 degree slope onto the tacky surface of each of the PET films placed horizontally, and the rolling distance (cm) of the steel ball on the tacky surface was measured. The shorter the distance (cm), the higher the tack. The measurement temperature was 20° C.

[Holding Power]

According to JIS Z 0237, each of the PET films was compress bonded to a stainless steel plate using a rubber roller weighing 2 kg, so as to form a bonding area of 25 mm×25 mm. The obtained stainless steel plates with the PET films were allowed to stand at 20° C. for 24 hours, and subjected to a creep test under 1 kg load at 70° C. for 1 hour. Thereafter, the distance of movement (mm) of the PET films on the stainless steel plates was measured. The shorter the distance of movement (mm), the better the holding power.

[Compound Thermal Discoloration Resistance]

50 g of each of the tacky adhesive compositions was separately placed in 140 cc mayonnaise bottles, and allowed to stand in a circulating air dryer at 180° C. After 48 hours, the degree of discoloration was visually inspected and rated on the following scale:
A; No discoloration, B; Slight discoloration, C; Notable discoloration.

Subtle differences are indicated by plus and minus signs.

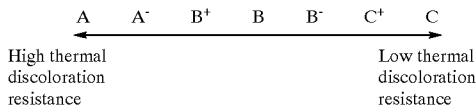

High thermal discoloration resistance ⟵ A  A⁻  B⁺  B  B⁻  C⁺  C ⟶ Low thermal discoloration resistance (Preparation of EVA Hot Melt Adhesive Compositions)

40 parts of one of each of the hydrogenated $C_9$ petroleum resins (tackifiers) obtained in Example 3 and Comparative Example 3, and 20 parts of a wax ("Hi-Mic-1080" manufactured by Nihon Seirou K.K.) were melted and mixed at 160° C. To each of the resulting mixtures, 40 parts of an ethylene-vinyl acetate copolymer ("Evaflex EV 220" manufactured by Du Pont-Mitsui Polychemicals Co., Ltd.) was gradually added, to thereby obtain adhesive compositions.

The obtained EVA hot melt adhesive compositions were tested for performance characteristics by the following methods:

[Adhesion]

Each of the adhesive compositions was heated to 180° C. for melting and applied on an aluminium foil (0.05 mm thick) with a bar coater. Each of the resulting aluminum foils was compression bonded to a corrugated cardboard as an adherend using an iron heated to 150° C., so as to form a bonding area of 25 mm×125 mm. The obtained corrugated cardboards with the aluminum foils were allowed to stand at 20° C. for 24 hours, and then subjected to a peeling test at an angle of 180 degree using a Tensilon tester at 20° C. to determine the adhesion (kg/25 mm).

[Holding Power]

Each of the adhesive compositions was heated to 180° C. for melting, and applied on an aluminium foil (0.05 mm thick) with a bar coater. Each of the resulting aluminum foils was compression bonded to a corrugated cardboard as an adherend using an iron heated to 150° C., so as to form a bonding area of 25 mm×25 mm. The obtained corrugated cardboards with the aluminum foils were allowed to stand at 20° C. for 24 hours, and subjected to a creep test under 0.5 kg load at 50° C. for 1 hour. Thereafter, the distance of movement (mm) of the aluminum foils on the corrugated cardboards was measured. The shorter the distance of movement (mm), the higher the holding power.

[Compound Thermal Discoloration Resistance]

50 g of each of the adhesive compositions was separately placed in 140 cc mayonnaise bottles, and allowed to stand in a circulating air dryer at 180° C. After 48 hours, the degree of discoloration was visually inspected and rated on the following scale:

A; No discoloration, B; Slight discoloration, C; Notable discoloration.

Subtle differences are indicated by plus and minus signs.

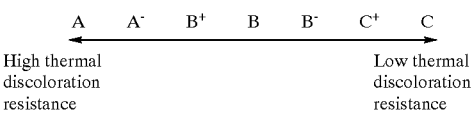

High thermal discoloration resistance ⟵ A  A⁻  B⁺  B  B⁻  C⁺  C ⟶ Low thermal discoloration resistance

TABLE 3

| | Hydrogenated $C_9$ petroleum resin | | Amount of SIS | Amount of SBS | Amount of oil | Amount of EVA | Amount of wax | Adhesion (kg/25 mm) | Tack (cm) | Holding power (mm) | Thermal discoloration resistance |
|---|---|---|---|---|---|---|---|---|---|---|---|
| | Species | Amount | | | | | | | | | |
| Ex. 1 | a | 100 | 100 | — | 30 | — | — | 1.9 | 4.7 | 0.9 | A |
| Ex. 2 | b | 55 | — | 25 | 20 | — | — | 0.9 | 4.4 | 1.6 | A |
| Ex. 3 | c | 40 | — | — | — | 40 | 20 | 2.0 | — | 0.0 | B⁺ |
| Ex. 4 | d | 55 | — | 25 | 20 | — | — | 1.0 | 5.0 | 1.6 | A |
| Ex. 5 | e | 55 | — | 25 | 20 | — | — | 0.8 | 4.4 | 1.6 | A |
| Comp Ex. 1 | f | 100 | 100 | — | 30 | — | — | 2.0 | 5.3 | 1.0 | A⁻ |
| Comp. Ex. 2 | g | 55 | — | 25 | 20 | — | — | 1.0 | 5.0 | 1.4 | B |
| Comp. Ex. 3 | h | 40 | — | — | — | 40 | 20 | 2.2 | — | 0.0 | C |
| Comp. Ex. 4 | i | 55 | — | 25 | 20 | — | — | 0.8 | 4.0 | 1.2 | B |
| Comp. Ex. 5 | j | 55 | — | 25 | 20 | — | — | 1.0 | 4.3 | 1.0 | B⁻ |

Table 3 reveals that the tacky adhesive compositions and hot melt adhesive composition obtained in the Examples are substantially equivalent in tack and adhesion characteristics to those obtained in the Comparative Examples, and have a higher compound thermal stability than those obtained in the Comparative Examples.

What is claimed is:

1. A process for preparing a hydrogenated $C_9$ petroleum resin, comprising hydrogenating a $C_9$ petroleum resin obtained by polymerizing polymerizable monomers of a $C_9$ fraction using a non-phenolic Friedel-Crafts catalyst in the presence or absence of a non-phenolic molecular weight modifier, wherein the polymerizable monomers include up to 20 wt. % of a monomer fraction having a higher boiling point than indene, at least 50 wt. % of vinyltoluene and up to 20 wt. % of indene" after "a higher boiling point than indene".

2. A process according to claim 1, wherein the non-phenolic Friedel-Crafts catalyst is boron trifluoride or a boron trifluoride ether complex.

3. A process according to claim 1, wherein the hydrogenation degree of the aromatic nuclei of the hydrogenated $C_9$ petroleum resin is at least 50%.

4. A hydrogenated $C_9$ petroleum resin obtainable by a process according to claim 1.

5. A tackifier comprising a hydrogenated $C_9$ petroleum resin according to claim 4.

6. An additive for plastics, comprising a hydrogenated $C_9$ petroleum resin according to claim 4.

7. An adhesive composition comprising a tackifier according to claim 5 and a base resin for adhesives.

* * * * *

UNITED STATES PATENT AND TRADEMARK OFFICE
CERTIFICATE OF CORRECTION

PATENT NO.   : 6,458,902 B1
DATED        : October 1, 2002
INVENTOR(S)  : Okazaki et al.

It is certified that error appears in the above-identified patent and that said Letters Patent is hereby corrected as shown below:

Column 5,
Lines 13, 15 and 16, "Kg/cm$^2$" should read -- kg/cm$^2$ --

Column 8,
Line 16, "subsquent" should read -- subsequent --

Column 10,
Line 65, "dissolviing" should read -- dissolving --

Column 12,
Line 20, "Example 3" should read -- Example 3. --

Column 15,
Lines 2-3, " after "a higher boiling point than indene" " should be deleted Signed and Sealed this Thirtieth Day of December, 2003

JAMES E. ROGAN
*Director of the United States Patent and Trademark Office*